United States

Crandall et al.

3,940,205
Feb. 24, 1976

[54] ELECTROCHROMIC DEVICE HAVING AN INDIUM ELECTRODE

[75] Inventors: Richard Seely Crandall; Brian Wilfred Faughnan, both of Princeton, N.J.

[73] Assignee: RCA Corporation, New York, N.Y.

[22] Filed: Sept. 9, 1974

[21] Appl. No.: 504,358

[52] U.S. Cl. ............................................. 350/160 R
[51] Int. Cl.² ............................................. G02F 1/36
[58] Field of Search ................................. 350/160 R

[56] References Cited
UNITED STATES PATENTS

| | | | |
|---|---|---|---|
| 3,451,741 | 6/1969 | Manos | 350/160 R |
| 3,521,941 | 7/1970 | Deb et al. | 350/160 R |
| 3,708,220 | 1/1973 | Meyers | 350/160 R |
| 3,840,288 | 10/1974 | Schnatterly | 350/160 R |

Primary Examiner—Vincent P. McGraw
Attorney, Agent, or Firm—Glenn H. Bruestle; Carl L. Silverman

[57] ABSTRACT

A layer of electrochromic material is on a substrate. An acid electrolyte is on the layer of electrochromic material. An indium electrode is utilized to produce coloration in the layer of electrochromic material without the need for any external electrical power. If a conductor layer is disposed between the substrate and the layer of electrochromic material, the device operates under a biasing voltage with substantially no polarization.

16 Claims, 4 Drawing Figures

ELECTROCHROMIC DEVICE HAVING AN INDIUM ELECTRODE

BACKGROUND OF THE INVENTION

This invention relates to electrochromic devices, and particularly, to an electrochromic device requiring minimal external electrical power for coloration and in which substantially no polarization occurs.

Electrochromic devices are well-known devices which exhibit a phenomenon known as "persistent electrochromism", e.g., see U.S. Pat. No. 3,521,941 entitled, "Electro-Optical Device Having Variable Optical Density," issued July 28, 1970. The term "persistent electrochromism" denotes the property of a material whereby its electromagnetic radiation absorption characteristic is altered, in most instances, even at ambient temperature, under the influence of an electric field. Such materials, for example, may exhibit little or no absorption of visible wavelength in the absence of an electric field, and therefore be transparent, but when subjected to an electric field, effectively absorb in the red end of the spectrum, turning blue in color. Similar effects can be observed in other portions of the electromagnetic spectrum, invisible as well as visible.

As described in the prior art, if a layer of a persistent electrochromic material is disposed between a pair of electrodes across which a potential is applied, the radiation transmitting characteristic of the material will change. If the electrodes and the electrochromic material are formed on the surface of a transparent substrate, such as glass, the light transmitting characteristics of the combination can be varied by controlling the electric field produced across the electrochromic material. For example, application of a voltage between the electrodes to establish an electric field of the proper polarity changes the light absorption characteristics of the electrochromic material, turning it darker, for example, thus decreasing the light transmitting ability of the entire assembly.

The phenomenon of "persistent electrochromism" has also been exhibited in electrochromic devices which include an electrolyte-electrochromic sandwich wherein the electrolyte functions both as a conductive medium and as a source of positive ions. For example, the sulfuric acid electrolyte of U.S. Pat. No. 3,708,220, issued Jan. 2, 1973. In these devices, the electrolyte is chosen as to be sufficiently conductive to permit low voltage operation of the electrochromic device while also being chemically compatible with the electrochromic layer and electrode employed in the device.

Although electrochromic devices have been developed and are successful for many applications, most electrochromic devices include electrochromic layers which require external electrical power for both coloration and for bleaching. Some electrochromic devices can be bleached by merely short circuiting the electrodes, but these devices still require external electrical power for coloration.

Furthermore, due to the electrochemical reactions occurring in conventional electrochromic devices, it has been found that the electrode adjacent to the electrolyte often becomes polarized. Polarization, when present, limits the switching speed, especially at contrasts in excess of 2:1, since the current decreases sharply with time. For example, aquadag, a conductive mixture of graphite and a non-conductive binder, is often employed as an electrode for electrochromic devices, since it is found that the graphite is capable of removing electrons from the negative ions in the electrolyte, thereby permitting a current flow. However, it appears that the aquadag electrode is responsible for polarization in the electrochromic device.

Although not wholly understood, it is presently believed that the removal of electrons from the negative ions in the electrolyte often creates a barrier of uncharged neutral species at the electrode. For example, with $H_2SO_4$ utilized as the acid electrolyte, the positive graphite electrode attracts the negative $SO_4^=$ radical and removes electrons from the negative $SO_4^=$ so as to leave a neutral $SO_2$ as well as $O_2$ species at the electrode. It is also suspected that negative $OH^-$ radicals may be attracted to the positive graphite electrode wherein these unstable $OH^-$ radicals react to form $H_2O$ and $O_2$ at the positive electrode. The neutral $SO_2$ and $O_2$ species can thereafter present a barrier to a flow of charge, thereby slowing down the switching speed or response time of the electrochromic device. Whether or not the above mechanisms prove to govern in these devices, the observed decrease in current with time, by definition, is caused by polarization. It would therefore be desirable to develop an electrochromic device which requires no external electrical power and one in which substantially no polarization occurs at the electrode adjacent the electrolyte.

SUMMARY OF THE INVENTION

An electrochromic device includes a substrate and a layer of electrochromic material on the substrate. An electrolyte is on at least a portion of the layer of electrochromic material. An electrode is utilized for contacting the electrolyte. The electrode is of a material capable of forming positive ions when in contact with the electrolyte.

DETAILED DESCRIPTION OF THE INVENTION

Figure 1:
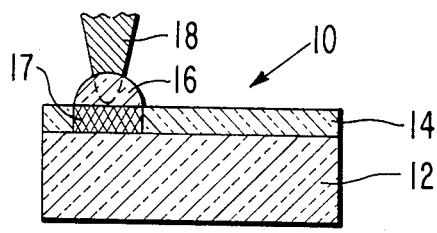
FIG. 1 is a cross-sectional view of one form of an electrochromic device of the present invention.

Referring initially to FIG. 1, one form of an electrochromic device of the present invention is generally designated as 10. The electrochromic device 10 includes a transparent substrate 12, such as glass, and a layer 14 of electrochromic material, such as tungsten oxide. An electrolyte 16, such as sulfuric acid or phosphoric acid, is in contact with a portion of a surface of the layer 14 of electrochromic material. As shown in FIG. 1, an electrode 18, of a material such as indium, is placed in the electrolyte 16 so as to be in contact with a portion of the electrochromic material of the layer 14.

As shown in FIG. 1, the layer 14 of electrochromic material colors, i.e., absorbs red so as to turn blue, under the region covered by the electrolyte 16, e.g., coloration will occur in a region 17 of the layer 14 of electrochromic material. The coloration begins at the point of contact and radiates outward. While not wholly understood, it is believed that coloration in this embodiment involves positive indium ions which go into solution in the electrolyte. It is believed also that by being in contact with the layer 14 of electrochromic material, electrons remaining in the indium electrode 18 are injected into the electrochromic material of the layer 14. The injected electrons then attract protons from the electrolyte into the electrochromic material.

The coloration process is believed to occur in any situation as described wherein the electrode 18 is of a material capable of forming positive ions in the electrolyte and also capable of injecting electrons into the layer 14 of electrochromic material. Other materials suitable for use as the electrode 18 include iron, magnesium, lead and gallium with indium, iron and magnesium being in the preferred group. As shown in FIG. 1, the electrochromic device 10 colors without the need for any external electrical power, a result not heretofore obtainable in the prior art. Thus, the electrochromic device 10 of FIG. 1 enables a user to take a movable electrode 18, of a material such as indium, dip it into an electrolyte, such as sulfuric acid, and then permanently write on the electrochromic material of the layer 14.

The electrochromic device of FIG. 1 can be constructed through methods well known in the art. For example, a layer 14 having a thickness of about 10,000A of electrochromic material, such as tungsten oxide, can be deposited, e.g., evaporated or sputtered, onto a transparent substrate, such as glass. An electrolyte 16, such as sulfuric acid or phosphoric acid, can be prepared and applied onto a portion of the layer 14 of electrochromic material as is well known in the art. The acid electrolyte 16 can be in the range of from about 0.5 molarity (M) to about 5M with about 2M being preferable. An electrode 18, such as indium, is readily available commercially.

Figure 2:
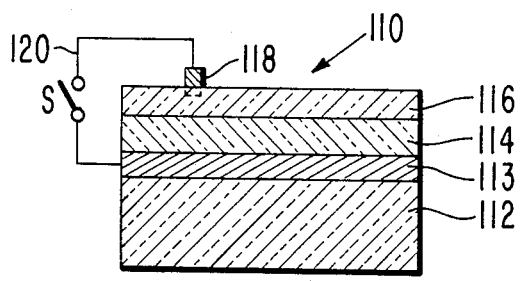
FIG. 2 is a cross-sectional view of another form of an electrochromic device of the present invention.

Another form of an electrochromic device of the present invention is shown in FIG. 2. The electrochromic device 110 of FIG. 2 also enables a user to produce coloration in the layer 114 of electrochromic material without the need for any external electrical power. The electrochromic device 110 includes a transparent substrate 112, such as glass, a conductor layer 113, which may be transparent, such as tin doped indium oxide, and a layer 114 of electrochromic material on the conductor layer 113. An electrolyte 116, such as sulfuric acid, is on the layer 114 of electrochromic material. The electrolyte 116 can be in the form of a gel as in previously mentioned U.S. Pat. No. 3,708,220.

The electrochromic device 110 can be colored by utilizing an electrode 118, of a material such as indium, although any of the previously described materials for the electrode 18 of FIG. 1 would also be successful. For coloration of the electrochromic device 110, the electrode 118 is electrically connected to the conductor layer 113, e.g., by a wire 120 and a switch S. In the operation of the electrochromic device 110, the switch S is closed, thereby electrically connecting the conductor layer 113 and the electrolyte 116. In the electrochromic device 110, the electrode 118 need not be in contact with the layer 114 of electrochromic material as required in the electrochromic device 10 of FIG. 1. For coloration to occur in the electrochromic device 110 of FIG. 2 it is sufficient that the electrode 118 merely be in contact with the electrolyte 116. It is believed that the electrons which must find their way to the electrochromic material of the layer 114 are supplied by the conductor layer 113. Thus, the electrode 118 need not be in contact with the electrochromic layer 114.

In the electrochromic device 110 of FIG. 2, coloration occurs in the entire area of the layer 114 of electrochromic material which is in contact with the electrolyte 116. If desired, the coloration produced in the layer 114 of the electrochromic material can be erased, i.e., bleached, by establishing an appropriate biasing voltage across the device. For example, the electrochromic device 110 can be bleached by establishing a potential difference in the devices such that the electrode 118 is negative with respect to the conductor layer 113.

It should be noted, however, that the electrochromic device 110 of FIG. 2 can be operated similarly to the electrochromic device 10 of FIG. 1, i.e., without the need for the wire 120 and switch S. When operated in similar fashion to the electrochromic device 10 of FIG. 1, the electrochromic device 110 of FIG. 2 exhibits coloration in which the electrochromic material of the layer 114 colors substantially uniformly beneath the electrolyte 116 since it appears that the electrons which are supplied by the electrode 118 must first pass through the electrolyte 114. Thus, coloration occurs in the electrochromic device 110 of FIG. 2 which coloration first appearing in the region where the electrons pass through the electrolyte 116. Then, after the electrons reach the conductor layer 113, the electrochromic material of the layer 114 colors uniformly.

Figure 3:
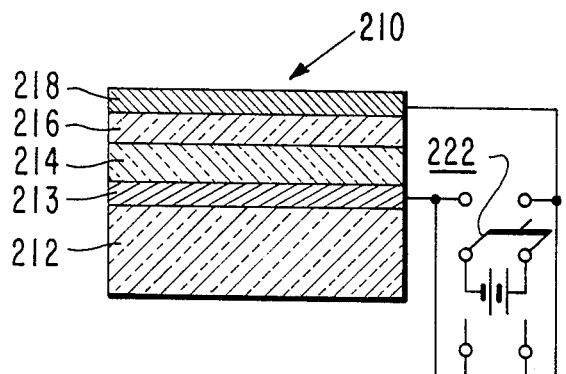
FIG. 3 is a cross-sectional view of still another form of an electrochromic device of the present invention.

Referring now to FIG. 3, still another form of an electrochromic device of the present invention is generally designated as 210. The electrochromic device 210 includes a transparent substrate 212, such as glass, with a conductor layer 213 which may be transparent, such as tin doped indium oxide, on the substrate 212. A layer 214 of electrochromic material having a thickness of about 10,000A such as tungsten oxide, is on the conductor layer 213. An electrolyte 216, such as sulfuric acid, is sandwiched between the layer 214 of electrochromic material and an electrode 218. The electrode 218 is of a material such as indium.

In the operation of the electrochromic device 210 of FIG. 3, a conventional biasing voltage is applied. For example, a network 222 enables one to reverse the biasing as desired wherein one biasing will produce coloration in the electrochromic material of the layer 214 and the opposite polarity will cause bleaching of the electrochromic material as is well known in the art. For example, when the electrode 218 is positive with respect to the conductor layer 213, coloration occurs. When the electrode 218 is negative with respect to the conductor layer 213, bleaching occurs. In the electrochromic device 210 substantially no polarization occurs at the electrode 218. It should be noted that although the electrochromic device 210 of FIG. 3 has been described having a conductor layer 213, the conductor layer 213 could be in a different form, e.g., in the form of segments for an alphanumeric display.

Although not wholly understood, it is believed that the electrode 218 of indium is primarily responsible for the lack of polarization observed in the present invention wherein the positive indium ions pass directly into the electrolyte 216 under one biasing voltage, thereby leaving electrons behind. Under the reverse biasing voltage, the positive indium ions are redirected back to the indium electrode 218 where a recombination of electron and positive ion takes place. It is believed that this process results in a condition wherein polarization cannot take place since it appears that there is no build up of neutral species on the electrode surface. Although the electrochromic device 210 has been described with an indium electrode 218, the electrochromic device of the present invention functions, as described, as long as the electrode 218 is of a material which is capable of forming positive ions in the electrolyte 213. An indium electrode 218 is preferable since such a material forms positive ions quickly in most acids although, as previously described, iron, magnesium, lead and gallium would also be suitable with indium, iron and magnesium being in the preferred group.

In addition to the lack of polarization obtained in the electrochromic device of the present invention, an additional unexpected advantage is that the electrode 218 need not cover the entire back surface of the device, as in prior art devices, since it appears that as long as the concentration of indium ions in the electrolyte solution is not appreciably reduced by the current pulse, the entire colorable area of the layer 214 of electrochromic material will color or bleach uniformly, regardless of the shape or position of the opposing electrode 218. This results in a new degree of freedom in device design.

Figure 4:
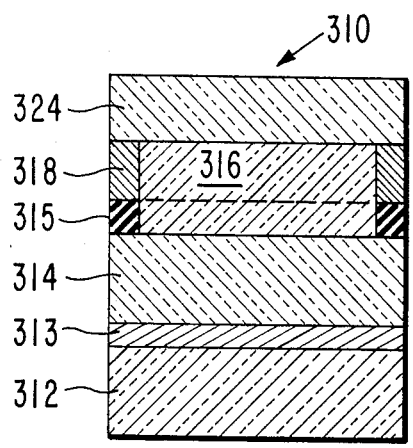
FIG. 4 is a cross-sectional view of still another form of an electrochromic device of the present invention.

For example, the electrochromic device 210 of FIG. 3 can be utilized wherein the electrolyte 216 includes a white powder, e.g., zirconium oxide, so as to improve the viewing properties of the colored area. In this design, the white powder functions to provide a contrast for the colored electrochromic material and can also provide optical isolation for the device. The electrochromic device 210 can also be designed so as to operate as a reflecton cell with a transparent electrolyte 216 and a mirror or colored reflective surface as a backing plate. In addition, the electrochromic device 210 can also be designed so as to function as a transmission cell with a transparent glass backing plate. The last two structures are not possible with the usual graphite electrode since the graphite electrode must cover the entire active area of the electrochromic material as outlined by the electrolyte in order for coloration to occur. For example, FIG. 4 shows an electrochromic device 310 of the present invention in which the electrode 318, of indium, is ring shaped and in contacting relation with only a portion of the electrolyte 316. A ring shaped insulating spacer 315 of a material which is inert to the acid electrolyte 316, e.g., a plastic, can be employed so as to prevent undesired coloration from occurring due to the contact of the electrode 318 with the layer 314 of electrochromic material. A transparent backing plate 324, e.g., glass, can be employed so as to create an electrochromic device 310 which functions as a transmission cell. If desired, a mirror or colored surface can be disposed between the backing plate 324 and the electrode 318 so as to create an electrochromic device 310 which functions as a reflection cell.

Although the electrochromic devices of the present invention have been described having tungsten oxide electrochromic layers, it is apparent that tungsten oxide is merely one of the many known electrochromic materials as described in previously mentioned U.S. Pat. No. 3,521,941. Furthermore, although much of the phenomenon of electrochromism is not presently understood, the electrochromic devices of the present invention function as described, whether or not the present theories explaining the phenomenon prove to be correct. Thus, electrochromic devices of the present invention can exhibit coloration without the need for any external power. Also, electrochromic devices of the present invention can operate under a biasing voltage with substantially no polarization.

We claim:

1. An electrochromic device comprising:
   a substrate,
   a layer of electrochromic material on said sustrate,
   an electrolyte on at least a portion of said layer of electrochromic material, and
   an electrode for contacting said electrolyte, said electrode being of a material capable of dissolving and forming positive ions when in contact with said electrolyte whereby coloration occurs in said layer of electrochromic material.

2. An electrochromic device in accordance with claim 1 in which said electrode is of a material capable of injecting electrons into said layer of electrochromic material when in contact with said layer of electrochromic material when said contact is surrounded by said electrolyte.

3. An electrochromic device in accordance with claim 2 in which said substrate is substantially transparent.

4. An electrochromic device in accordance with claim 2 having an acid electrolyte.

5. An electrochromic device in accordance with claim 4 in which said electrode comprises indium.

6. An electrochromic device in accordance with claim 5 in which said electrochromic material comprises tungsten oxide.

7. An electrochromic device in accordance with claim 1 in which a conductor layer is disposed between said substrate and said layer of electrochromic material and in which said electrode is selected from the group consisting of indium, iron and magnesium.

8. An electrochromic device in accordance with claim 7 which includes means for electrically connecting said electrode to said conductor layer.

9. An electrochromic device in accordance with claim 7 in which said substrate and said conductor layer are substantially transparent.

10. An electrochromic device in accordance with claim 9 having an acid electrolyte.

11. An electrochromic device in accordance with claim 10 in which said electrode comprises indium.

12. An electrochromic device in accordance with claim 11 in which said conductor layer comprises tin doped indium oxide.

13. An electrochromic device in accordance with claim 12 in which said electrochromic material comprises tungsten oxide.

14. An electrochromic device in accordance with claim 11 in which said electrode is in contacting relation with only a portion of said electrolyte.

15. An electrochromic device in accordance with claim 14 in which said electrolyte is substantially transparent.

16. An electrochromic device in accordance with claim 1 in which said electrode is selected from the group consisting of indium, iron and magnesium.

* * * * *